INVENTOR.
FRANK W. CHURCH, JR.

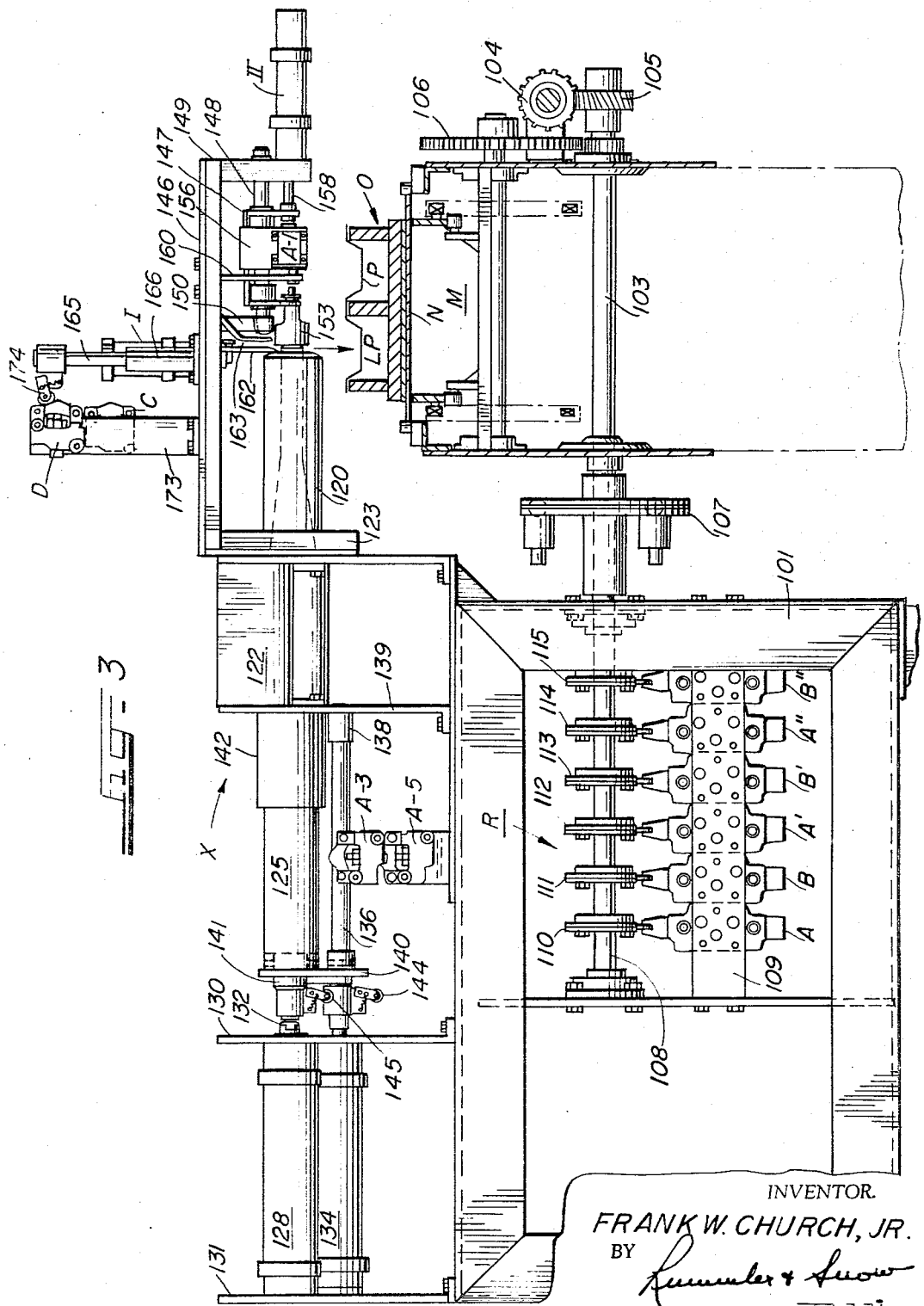

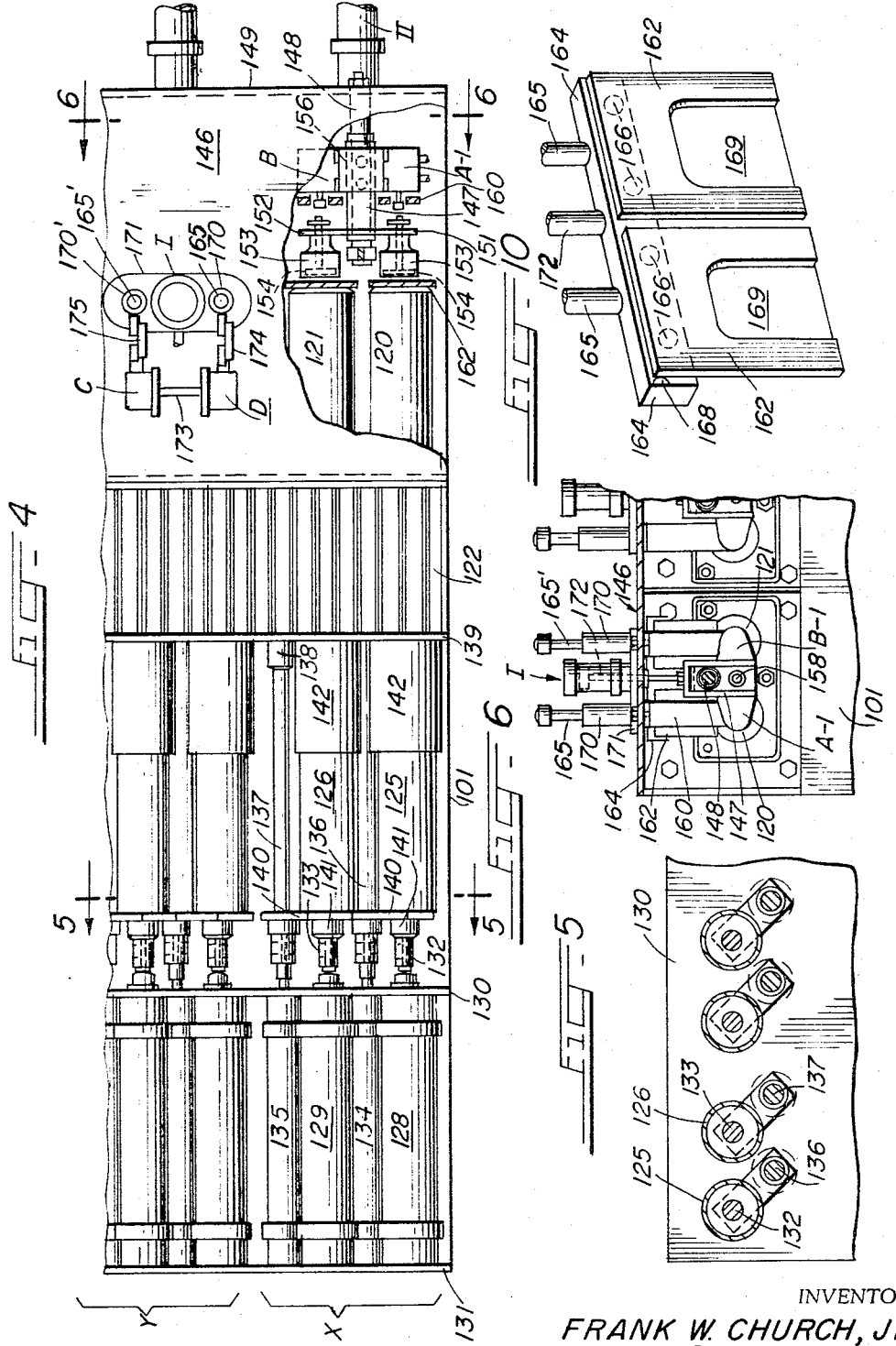

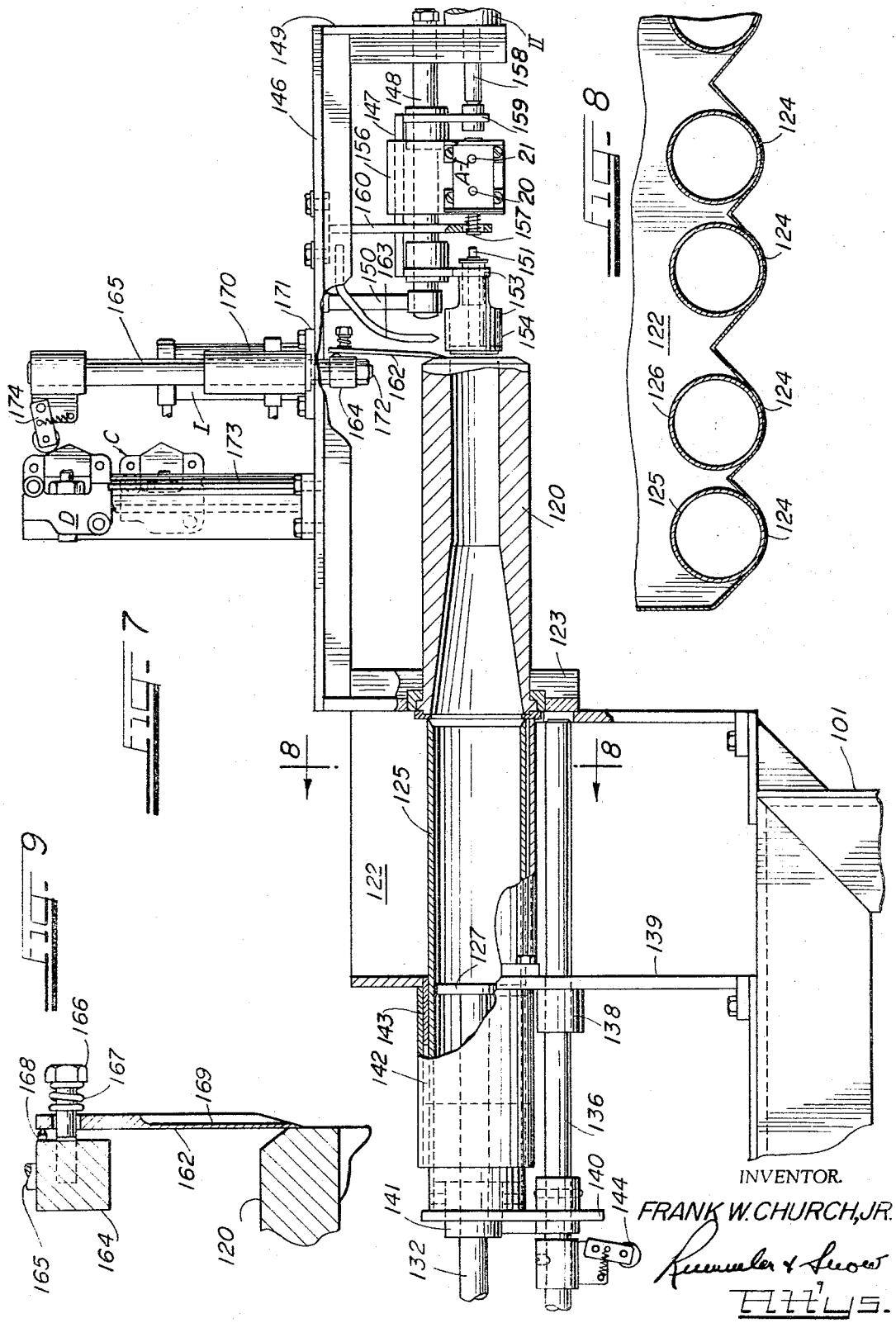

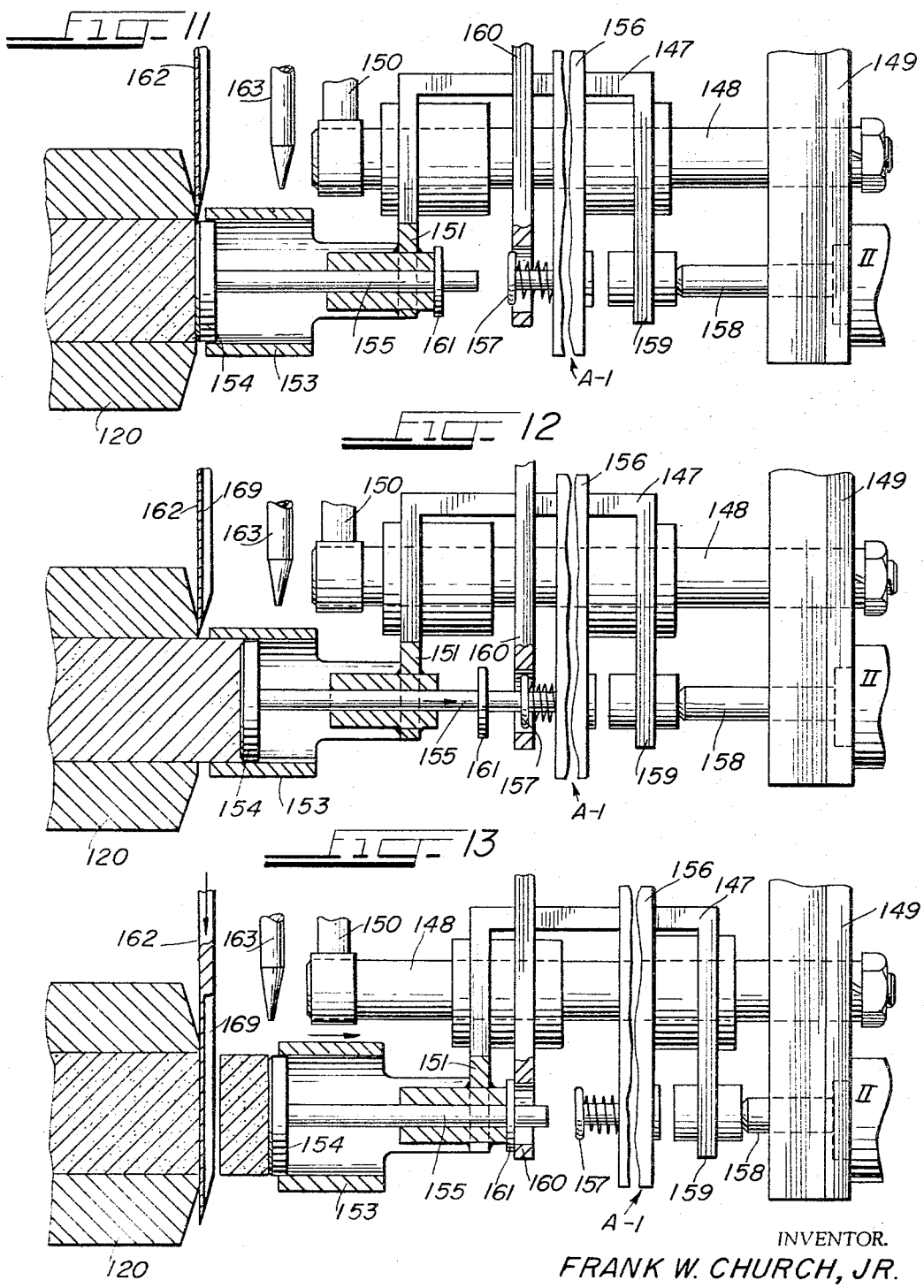

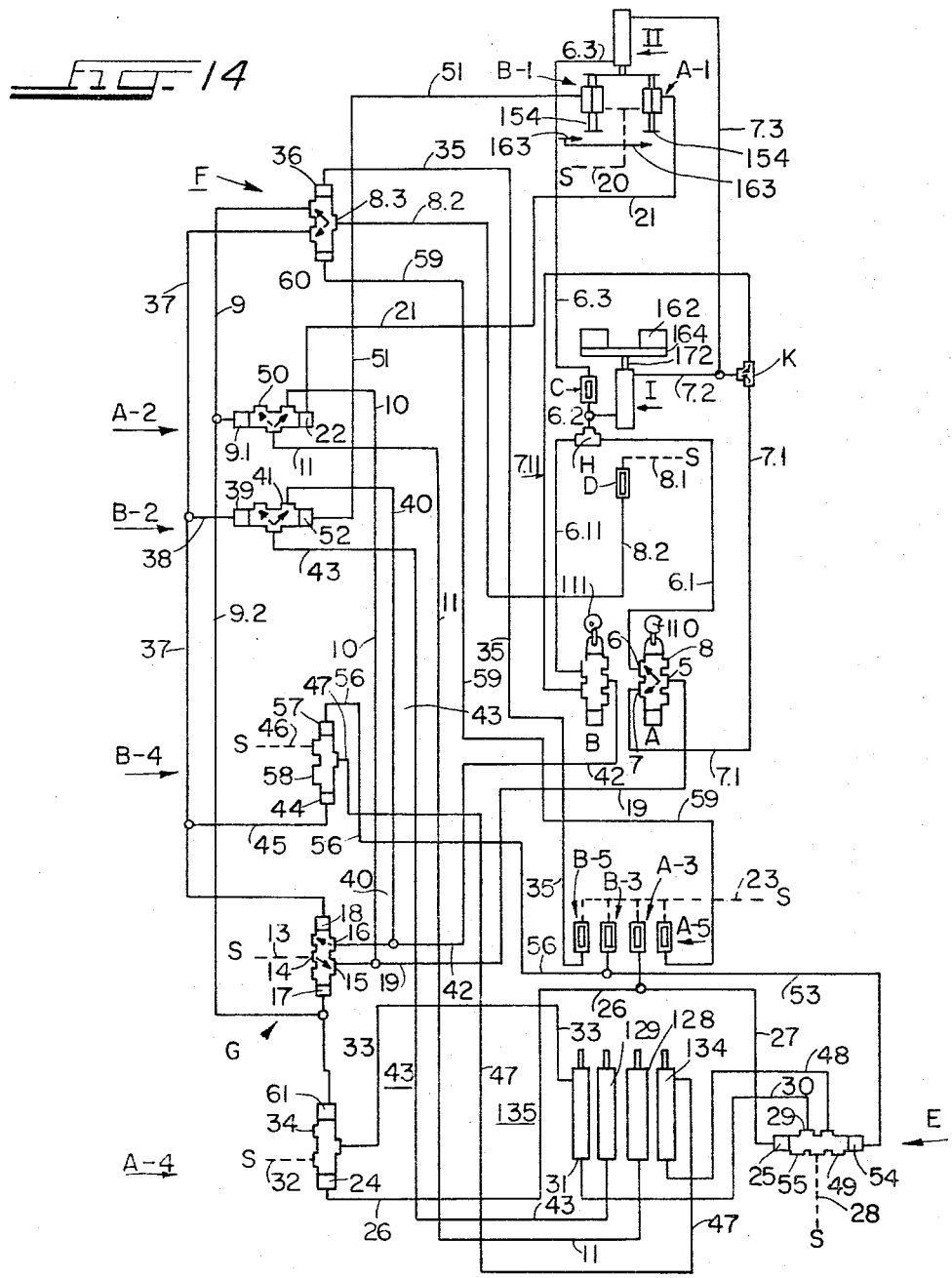

United States Patent Office 3,334,673
Patented Aug. 8, 1967

3,334,673
MEAT PIE-FILLING MACHINE
Frank W. Church, Jr., Kankakee, Ill., assignor to Colborne Manufacturing Company, Chicago, Ill., a corporation of Illinois
Filed Oct. 9, 1964, Ser. No. 402,808
16 Claims. (Cl. 146—158)

This invention concerns apparatus for automatically depositing a filling material into each of successive receptacles moving continuously along a predetermined path; and in particular this invention concerns such apparatus for depositing individual portions of a material that is extruded under pressure from a nozzle.

The main objects of this invention are to provide a machine for depositing diced meat into individual pie plates or receptacles as they are being transported by a continuously moving conveyor; to provide such a machine that is automatic and continuous in its operation; to provide such a machine wherein the material handled is extruded from a nozzle and automatically measured during extrusion to form individual portions of a uniform predetermined size; and to provide such apparatus wherein the measured extruded portions are severed and delivered in precisely timed relation with predetermined increments of conveyor travel and regardless of conveyor speed.

Other objects of this invention are to provide automatic meat patty forming and measuring means capable of depositing filling material into each of a plurality of receptacles carried as a group on each of a continuously moving succession of conveyor flights; to provide such apparatus which comprises a plurality of depositor units, one for each receptacle of a predetermined group, and wherein each depositor unit is operated independently of the others; and to provide such apparatus that is capable of delivering measured portions of diced material by extrusion from a nozzle without destruction of the diced or chunky nature of the material.

A specific embodiment of this invention is shown in the accompanying drawings in which:

FIG. 3 is a side elevational view of the machine of FIG. 1 showing its operative relation with the plate conveyor of a continuous pie machine, the extruding mechanism being shown in retracted position;

FIG. 4 is a fragmentary top plan view of the machine of FIG. 1, showing a pair of the extrusion units, partly broken away to show the dual nozzles and the measuring means for one of the extrusion units;

FIG. 5 is a fragmentary sectional view, as taken on line 5—5 of FIG. 4, to show the relation of the piston rods for operation of each of the extrusion nozzles;

FIG. 6 is a fragmentary sectional view, as taken on line 6—6 of FIG. 4, showing details of the patty size measuring means;

FIG. 7 is an enlarged, partially sectioned, elevational view of the extruding and measuring portion of the machine shown in FIG. 3, the extrusion sleeve being shown in its actuated or forward position;

FIG. 8 is a fragmentary sectional view of the same, as taken on line 8—8 of FIG. 7, showing the form of the bottom of the filling material hopper and the relation of the extrusion sleeves which core the filling material for entry into the extrusion nozzles;

FIG. 9 is an enlarged fragmentary elevational view partly in section showing the manner of mounting the cut-off knives onto the knife carrier yoke;

Figure 1:
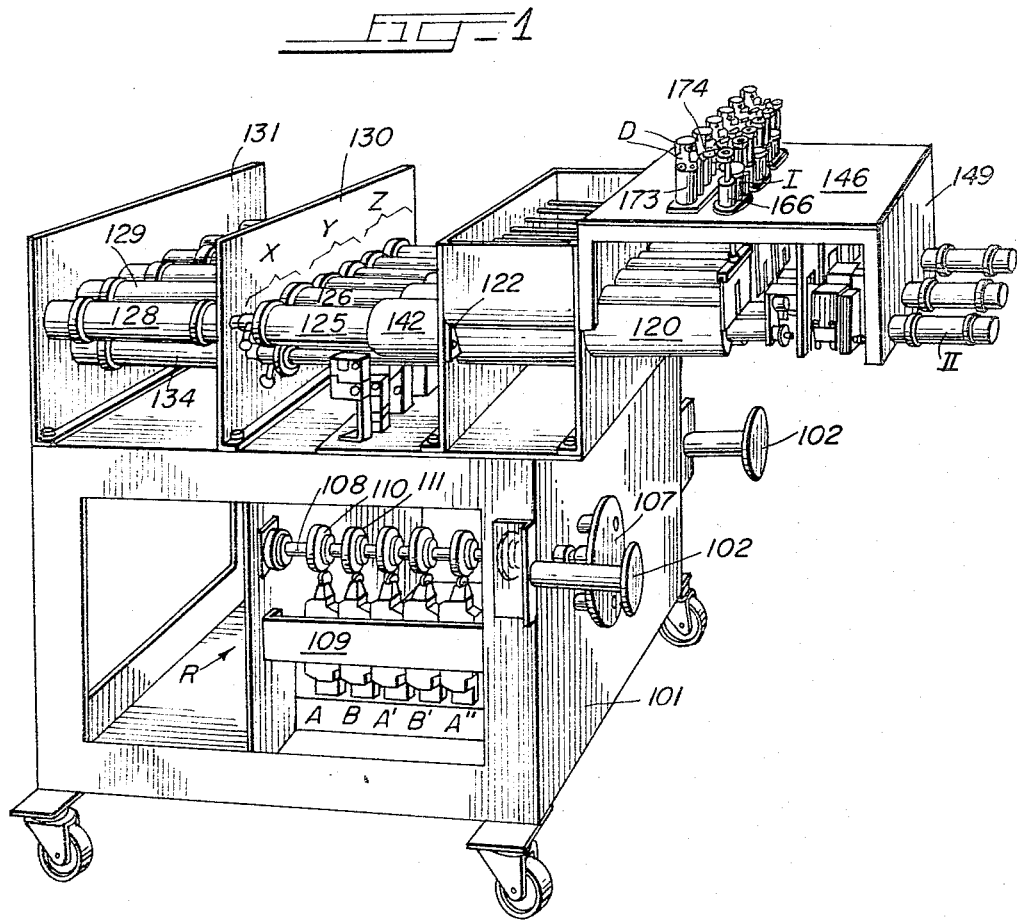
FIGURE 1 is a perspective view of a meat pie filling machine embodying the present invention and arranged for filling each of three individual pies carried as a group on a single flight of a pie machine conveyor.

FIG. 10, appearing on Sheet 3, is a perspective view showing the form and arrangement of the cut-off blades;

FIG. 11 is a fragmentary, partly sectioned detail showing the delivery end of an extrusion nozzle and the patty-size measuring means at the instant that extrusion of filling material begins, that portion containing the pressure fluid control valve and designated by the letter V being broken away;

FIG. 12 is a similar view showing the relation of the parts at the instant that extrusion is stopped by operation of the patty-size measuring means;

FIG. 13 is a similar view showing the relation of the parts, after operation of the cut-off knife and retraction of the size measuring cup, at the instant of release of a completed filling material patty to be dropped into a pie plate, and FIG. 14 is a diagrammatic view showing the circuitry for the pneumatic control system for one dual-nozzle patty forming and depositing unit of the machine shown in FIG. 1.

The inventive concept herein disclosed resides in the provision of dual intermittently operated means for extruding an edible material for forming successive patties of the said material of an exact predetermined size, controlling the operation of the extrusion means by a patty size measuring device, cutting off and depositing the measured patty in precisely timed relation with the travel of receptacles carried by a continuously moving conveyor, and automatically shifting the extrusion function between the dual extruding means to permit recharging of one while the other is delivering so as to provide a continuous supply of measured patties for an endless series of receptacles.

Figure 2:
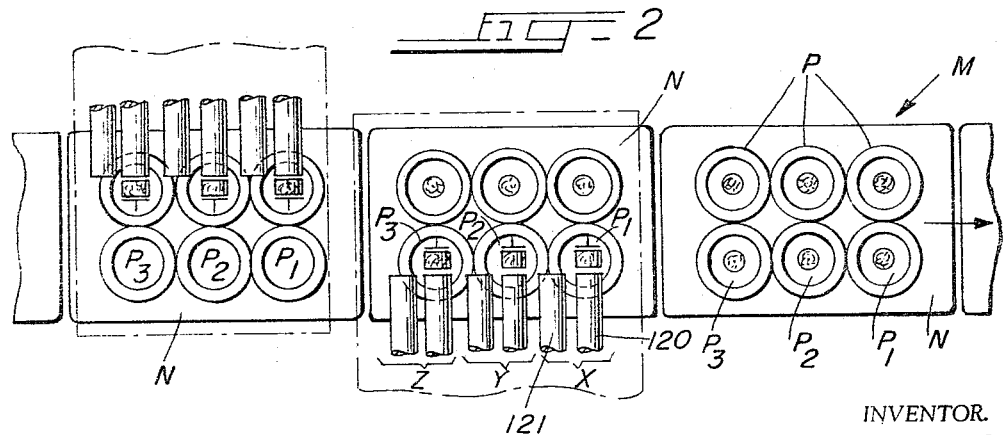
FIG. 2 is a diagrammatic view illustrating the group arrangement of six individual pies on each of a succession of conveyor flights and the manner by which the pies are filled individually by the delivery nozzles of a pair of the machine shown in FIG. 1.

In general the machine herein disclosed is designed for depositing meat patties in individual-size meat pies being made on a continuously moving conveyor means, which is part of an automatic pie machine, a plurality of the individual-size meat pie plates or receptacles being arranged in a group on a respective plate holder mounted on each of an endless series of conveyor flights, and a separate patty forming and depositing unit being provided in the machine for each of the longitudinally successive pie plates contained in a group. This system is diagrammatically illustrated in FIG. 2 of the drawings wherein the conveyor M comprises a series of flights or carriers N each of which has a plate holder O (see FIG. 3) arranged to receive and hold six pie plates P disposed in two parallel rows of three extending in the direction of conveyor travel which is indicated by the arow in FIG. 2. As shown in FIG. 1, the patty forming and depositing machine herein described comprises three independent forming and depositing units X, Y and Z and because each plate holder has six plates to be filled two of the machines are indicated in FIG. 2, one on each side of the conveyor M. Because the construction and operation of the two machines are the same only one will be shown and described and referring to FIG. 1 it will be seen that in general the machine comprises a box-like base 101, mounted on casters, and having a generally flat top surface on which is mounted the three patty forming and depositing units X, Y and Z, all arranged in parallel and aligned, side by side, across the top of the base 101 in such a manner as to overhang the side of the machine adjacent the conveyor M (see FIG. 3).

FIG. 3 shows the relation of the patty forming and depositing machine and the pie plate conveyor M, the patty delivering ends of the forming and depositing units being disposed directly above the line of travel of the adjacent row of pie plates P. Spacer elements 102 extending from the base 101 fix the alignment of the nozzles and conveyor. The conveyor M is driven at a continuous speed by motor means, not shown, suitably connected to a cross shaft 103, through spiral gears 104–105, the cross shaft being connected to the conveyor by way of gear 106. As shown the patty forming and depositing machine is directly coupled to the conveyor M by a coupling 107, attached to an outboard extension of the conveyor cross shaft 103, for transmission of power from the conveyor to the operation control system R of the patty forming and depositing machine, which control system comprises a main shaft 108, directly driven in positively timed relation with the operation of the conveyor through the coupling 107.

The operation of the patty forming and depositing mechanism will be described in detail hereafter and for the present it is only necesary to point out that each forming and depositing unit of the machine comprises two independently operated extrusion nozzles, as indicated in FIG. 2; that each nozzle is individually controlled for its patty forming and depositing function by its own control means; and that each control means is operated in timed relation with the travel of the plate holders on the conveyor M. Thus, since the patty forming and depositing machine comprises three depositing units, one unit for each pie plate in a plate holder group of three, and each unit has two extrusion nozzles, a total of six of the individual nozzle control means are required in the control system R. In the form shown in FIGS. 1 and 3 the control system R comprises 6 fluid pressure flow control valves A–B, A'–B' and A"–B". These control valves are of a normally closed cam operated type and are mounted in a row in the base 101, on a support plate 109, so as to be aligned parallel with the main shaft 108 for operation by the respective cams 110, 111, 112, 113, 114 and 115 carried by the shaft 108. Each of the cams is angularly adjustable about the axis of the shaft 108 and the conveyor drive is such that the shaft 108 is turned one full revolution as the conveyor M travels the distance from center-to-center of the conveyor flights N. Thus, each cam can be adjusted to operate its respective control valve at precisely the right time to cause a patty to be deposited from the respective nozzle when a pie plate is in proper position to receive the patty.

A typical straight-line pie machine will have its conveyor flights N spaced on 20 inch centers along the path of travel and each plate holder O will have the same relation with the center of its flight as the others. For "individual" size, 5 inch diameter, pies the plates are grouped in two rows of three plates each with the plates on 5½ inch centers in each row and the rows being spaced apart 5¾ inches center-to-center. Thus, as shown in FIG. 2, one machine would be provided for each row of pie plates and a unit of dual extrusion devices will be provided in the machine for each pie plate in the row. As shown, unit X will supply pie plate $P_1$, unit Y will supply pie plate $P_2$ and unit Z will supply pie plate $P_3$. In such an arrangement the respective control valve operating cams will be adjusted to effect delivery of a patty from one or the other of each pair of extrusion nozzles as the particular pie plate to be supplied by each pair of nozzles comes into position during the continuous travel of the conveyor M. Thus each pie plate in the adjacent row on each conveyor flight will be supplied by its respective patty forming and delivery unit and because the main shaft 108, on which the cams are carried, is rotated one full revolution during the course of conveyor travel over the center-to-center spacing of the conveyor flights each successive group of pie plates will be likewise supplied as long as the conveyor is in operation.

*The patty forming and depositing mechanism*

Since all units of the patty forming and depositing machine are the same and each is operated and controlled independently of the others, only one of the units will be described in detail. For convenience of illustration unit X, the foreground unit in FIG. 1, will now be explained.

As shown in FIGS. 3 to 7, inclusive, the unit X comprises a pair of extrusion nozzles 120–121 extending side by side from one side of a supply hopper 122, for the material to be extruded, and disposed with their discharge ends overhanging the conveyor M directly above the adjacent row of pie plates P (FIG. 3). For convenience sake the hopper 122 extends entirely across the machine, as shown in FIG. 1, and supplies all of the six extrusion nozzles comprised in the three separate patty forming and delivery units. Thus all of the extrusion nozzles are mounted rigidly in a common support plate 123, extending across the adjacent side of the hopper 122, and all of the nozzles open into the hopper 122 adjacent its bottom, which as shown in FIG. 8, is formed to provide a separate, axially aligned, rounded bottom channel 124 for each nozzle. As shown, these channels have a depth of about one-half the diameter of the nozzle opening into the hopper and their purpose is to obviate "dead" areas in the hopper and urged the contents of the hopper into alignment with the nozzles since the means for forcing the material in the hopper into each of the nozzles is of annular section and about the same diameter as the opening into the nozzle.

The means for extruding material from the hopper 122 is best seen in FIGS. 3 and 7, FIGS. 4, 5 and 6 mainly illustrating the manner in which the several units are arranged relative to each other on the base 101, and the manner in which the two patty forming and depositing sections of each unit are correlated. The two sections of each unit are identical and for convenience of description they will be referred to as section A, which concerns the nozzle 120, and section B, which concerns the nozzle 121. FIGS. 3 and 7 are intended to illustrate, primarily, the components of section A of the X unit but it will be understood section B is a duplicate of section A. The elements of unit X that are common to both sections A and B are the patty size measuring means and the patty cut-off or severing means which operates to deliver a completed patty of predetermined size at the proper instant to supply a respective pie plate P, which elements will be described in detail later herein.

As shown the extrusion means comprise a pair of core forming sleeves 125–126, one for each nozzle, arranged to be reciprocated in respective channels 124 of the hopper 122. The stroke for each sleeve is the width, in the axial direction of the nozzles, of the hopper 122 and the function of the sleeves is to cut through the mass of material in the hopper to form a core of the material which can then be compressed and forced into the respective nozzle. The forcing means comprises a pair of plungers, one of which is shown at 127 in FIG. 7, disposed for coaxial reciprocation within the respective sleeves to force the core of material from the sleeves into the respective nozzle. Thus as shown in FIG. 7 the sleeve 125, upon being driven through hopper 122, seats against the entering end of the nozzle 120 to form and align a core of the material in the hopper with the nozzle. Then forward movement of the plunger 127, to the right in FIG. 7, forces the core of material into the nozzle 120 where the material is further compressed in the radial direction and ultimately extruded from the front or delivery end of the nozzle.

The means for operating the plungers 127 comprises a pair of pressure cylinders 128–129 mounted between a pair of support plates 130–131 extending from the top surface of the base 101. These cylinders are axially aligned with the respective sleeves 125–126 and each contains a piston, not shown, and a connecting rod means 132–133 attached to a respective plunger 127. Operation of the plunger cylinders 128–129 forces the respective plunger 127 into the respective sleeve 125–126 and causes extrusion of the material in the sleeve from the respective nozzle 120–121. This, however, must not occur until after the respective sleeve 125–126 has been driven through the hopper 122 to form the core of material for the plunger 127 to act upon.

The sleeves 125–126 are operated by respective reversible cylinders 134–135, mounted between the support plates 130–131, parallel with and laterally offset from the respective plunger cylinders 128–129. A piston, not shown, in each of the cylinders 134–135 is connected to a respective piston rod 136–137 which extends axially forward and into a respective, suitably bushed, boss 138 mounted on and projecting rearwardly from the rearward support plate 139 for the hopper 122. As shown the piston rods 136–137 are each rigidly connected to a respective sleeve by means of a yoke plate 140 which extends radially from the piston rod and is firmly connected to the rearward end of the respective sleeve, the yoke plate 140 having a suitably bushed boss 141 slidably mounted on the connecting rod for the plunger operating in the respective sleeve. In this way each element of the co-axial sleeve and plunger combination can be individually operated as will be hereinafter explained.

As shown in FIGS. 3 and 7 each sleeve is slidably supported in an elongated cylindrical member 142 mounted on the hopper support plate 139 and extending rearwardly therefrom. This member 142 is suitably bushed, as at 143 (see FIG. 7) to provide firm support for the respective sleeve and keep it axially aligned with the respective nozzle. Also the piston rods 136–137 for the sleeves are supported in the respective bosses 138 so as to provide axially spaced two-point support for the piston rods and keep them axially parallel with the movement of the respective sleeves.

As shown in FIG. 3 the piston rod or operating shaft 136, for the sleeve 125, is provided with a fixed, unidirectional, valve actuating arm 144 for momentarily opening a normally closed valve A–5, suitably mounted and positioned on the base 101, when the sleeve 125 reaches the end of its forward stroke to seat against the entering end of the nozzle 120. Likewise, the connecting rod 132, for the plunger 127 operating in the sleeve 125, is provided with a fixed unidirectionally operating valve actuating arm 145 for momentarily opening a normally closed valve A–3 when the plunger 127 approaches the end of its forward stroke. The valves A–5 and A–3, as shown in FIG. 3, are components of the A section of the patty forming and depositing unit X which comprises the nozzle 120, the sleeve 125, its operating shaft 136 and the plunger 127 which works in the sleeve. The B section of the unit X is also provided with a like set of valves, shown diagrammatically in FIG. 14 and hereinafter designated B–5 and B–3, and suitable operating arms therefor which are, respectively, mounted on the piston rod 137 for the sleeve 126 and on the connecting rod 133 for the plunger 127 operating in the sleeve 126. The function of the valves A–5 and A–3 will be described later herein in connection with the operation of the unit X as a whole.

*The patty sized measuring means*

A primary function of the machine herein described is to form and deliver patties of a uniform predetermined size and weight, and for this purpose a patty size measuring means, actuated by the material being extruded from the nozzle is provided, the patty-size measuring means serving to control the extrusion of the material from the nozzle so that the extrusion is automatically stopped when a patty of the predetermined size has been formed. As shown in FIGS. 3, 4 and 7, the patty-size measuring means is supported by an overhanging platform-like structure 146 which extends forwardly from the base 101 above the extrusion nozzles and sufficiently beyond the same to mount the patty-size measuring means in alignment with the discharge ends of the nozzles. Separate measuring elements are provided for each of the nozzles 120 and 121 of the unit X, as indicated in FIGS. 4 and 6, since each controls the extrusion from the respective nozzle independently of the other. The measuring elements are, however, connected in tandem for operation to release the formed patties for deposit in the respective pie plate, as a matter of structural expedience and to simplify the arrangement of the system controls. The two measuring elements are identical however and, therefore, only the structure of one, as shown in FIGS. 3, 7, 11, 12 and 13 will be described.

As shown generally in FIGS. 3 and 7, and in detail in FIGS. 11, 12 and 13, the patty-size measuring means comprises a bracket member 147 mounted for horizontal reciprocation on a slide bar 148, which in turn is supported between an end plate 149 at the outboard end of the overhanging portion 146, and a hanger member 150 located adjacent the discharge end of the nozzle 120. As indicaated in FIGS. 4 and 6 the slide bar 148 is located with its axis midway between the centerlines of the nozzles 120 and 121, and the bracket 147 has a pair of laterally extending arms 151 and 152, at its inner end each of which supports an annular measuring cup 153 which is axially aligned with the respective nozzles 120 and 121. Within the measuring cup 153 is an annular pressure pad 154 which has substantially the same area as the internal cross-section of the measuring cup 153, which in turn is of substantially the same diameter as the discharge opening of the adjacent extrusion nozzle.

As shown best in FIGS. 7, 11, 12 and 13, the pressure pad 154 and its surrounding cup 153, are normally disposed in close proximity to the discharge end of the nozzle 120 for direct engagement by the extruded material almost immediately that the material emerges from the nozzle. The pressure pad 154 has a rearwardly extending stem 155 slidably mounted in a suitable boss portion 153' by means of which the measuring cup 153 is integrally attached to the respective bracket arm 151. Thus, as the material being extruded issues from the nozzle 121, it engages the pressure pad 154 and forces it rearwardly into the measuring cup 153. In the form shown a saddle member 156 is mounted on the slide bracket 147 and supports a normally closed flow-control valve A–1 on one side of the slide bar 148 and a like flow-control valve B–1 on the opposite side of the side bar 148. The valve A–1 has a push-button like operating member 157, axially aligned with the stem 155 extending from the pressure pad 154. Thus when the pressure pad 154 is forced rearwardly a predetermined distance into the measuring cup 153 by the material extruded from the nozzle 120, the stem 155 will engage the operating element 157 of the valve A–1 and cause the valve to be opened for the passage of pressure fluid therethrough as will be hereafter described in connection with the operation of the machine, the valve B–1 on the opposite side of the saddle 156, aligned with the stem of the pressure pad 154 associated with the nozzle 121, is actuated in the same manner and for a similar purpose as will be hereafter described.

Also as shown, a cylinder II is mounted on the exterior of the end plate 149 directly below the slide bar 148, the cylinder II having a piston rod 158 connected to a depending leg 159 on the slide bracket 147. The cylinder II serves the function of reciprocating the slide bracket 147 on the slide bar 148 as will be hereafter described.

Also as shown in FIG. 7, a stop bar 160, depending from the extension platform 146, extends downwardly across the axis of the valve operating member 157, the valve member 157 extending into an axially aligned opening in the lower end of the stop member 160. The function of this stop member will be later described.

The operation of the patty-size measuring apparatus is best described by reference to FIGS. 11, 12 and 13.

Referring particularly to FIG. 11 the patty-size measuring means is shown in its starting or neutral position, wherein the parts are all shifted forwardly on the slide bar 148 to dispose the measuring cup element 153 as close as practicable to the discharge end of the extrusion nozzle 120. At this position the pressure pad 154 will project slightly beyond the forward end of the measuring cup 153 so as to be substantially flush with the end of the extrusion nozzle 120. This is the position of the parts as the slide bracket 147 is moved to its forwardmost position by the fluid pressure cylinder II, which is the operating element for this patty-size measuring device. It will be seen from this FIG. 11 that the pressure pad stem 155 is axially aligned with, and its end is normally spaced from, the operating member 157 for the valve A–1, which is not shown in FIGS. 11, 12 and 13, but which will be understood to be mounted on the saddle element 156, which in these figures is partially broken away. In this case, the valve element is indicated generally by the letter V and the bracket associated with the broken saddle member 156.

As shown in FIG. 11 the extruded patty cut-off knife 162 is normally poised in its upper position with its edge bearing against the forward end of the nozzle 120, just above the outlet passage therefrom. Also a blow-off nozzle 163 is disposed forwardly of the cut-off blade 162 above the measuring cup 153 in position to deliver a stream of compressed air against the severed patty sufficient to assure drop-off of the patty from the pressure pad 154, as will be hereinafter described more in detail.

FIG. 12 illustrates the operation of the patty-size measuring device for determining the size of the patty or the amount of material extruded from the nozzle 120. As shown in this view the material extruded from the nozzle has entered the measuring cup 153 and has pushed the pressure pad 154 into the cup 153 a distance sufficient for the pressure pad stem 155 to engage the actuating member 157 for the valve A–1. The operation of the valve A–1, by the push-button-like member 157, stops the extrusion operation under the action of the plunger 127 which forces the material to be extruded from the sleeve 125 into the nozzle 120 (see FIG. 7). This control of the extruding plunger 127 will be more fully described hereafter in connection with the operation of the machine.

The patty measuring parts are now ready for the patty severing and depositing operation which is initiated by the pie machine conveyor actuated cam 110 operating the valve A (see FIG. 3), a pie plate having now reachd a position directly below the nozzle 120. The patty severing and depositing operation begins with the descent of the cut-off knife 162 to the position shown in FIG. 13. At the instant that the cut-off knife 162 reaches the bottom of its stroke, the operating cylinder II is actuated to retract its piston rod 158 so as to pull the slide bracket 147 in the direction away from the discharge end of the nozzle 120. This causes the severed patty to be moved outwardly away from the nozzle 120, but then the stop collar 161 on the measuring pad stem 155 is brought into engagement with the fixed stop member 160 whereupon continued outwardly movement of the measuring cup 153, as it is carried by the slide bracket 147, causes the stem 155 together with the pressure pad 154, to be pushed outwardly from the measuring cup 153 so as to dispose the patty without support directly above the pie plate into which it then drops.

Because the material of the patty might sometimes adhere to the face of the pressure pad 154 and cause a slight delay in the dropping off of the patty, the air nozzle 163 is operated to deliver a slight air pressure stream against the patty at a point adjacent the face of the pressure pad 154. The nozzle 163 is operated at the same time as the operating cylinder II. This will be later described in connection with the operation of this machine.

When the patty has been deposited in the respective pie plate, continued travel of the pie plate on the conveyor M will cause the timing cam 110 to release the valve A which automatically results in elevation of the cut-off knife 162 and a reverse operation of the cylinder II so as to restore the patty cut-off elements and the patty-size measuring device to its initial or starting position shown in FIG. 11.

The patty cut-off means

The patty cut-off mechanism is best illustrated by FIG. 7, taken in conjunction with FIGS. 6, 9 and 10. The cut-off blades for the two nozzles 120 and 121 of the section X of the machine, are shown in detail in FIGS. 9 and 10, and as shown in FIG. 10 two blades 162 and 162' are mounted in tandem on a common carrier bar 164, and are so spaced apart as to be centered on the axes of the respective nozzles 120 and 121, the carrier bar 164 having a pair of guide bars 165 and 165' each extending vertically upward from substantially the center of the location of a respective blade on the carrier bar. As shown, each blade is mounted on the carrier bar 164 by a pair of bolts or machine screws 166, and as shown in FIG. 9 the blades are loosely mounted on the machine screws and are biased toward the carrier bar 164 by means of compression springs 167 disposed on the screws between the blade and the screw heads. Also the adjacent face of the carrier bar is provided with a longitudinally extending rib 168 adjacent its upper edge and against which the upper margin of the blade 162 bears. Since the rib 168 is located above the machine screws 166, which support the blade 162, the blade will normally be tilted under the action of the springs 167 so that its lower or cutting edge will always bear against the discharge end of the nozzle 120.

As shown in FIGS. 9 and 10 the central portion of each cut-off blade 162 is ground away over the area that would be intercepted by the projected area of the measuring cup 153 as the blade 162 passes across the nozzle 120 to sever a patty therefrom. Thus cut-away portion of the blade, indicated at 169 in FIGS. 9 and 10, serves the dual function of providing an extremely thin cutting area for the blade while maintaining ample strength in the main body of the blade, and at the same time permits the measuring cup 153 to be disposed as close as practicable to the end of the extrusion nozzle 120 until the formed patty has been severed therefrom. For example, with a blade body $3/16$ inch thick the ground-out portion 169 can be formed to a depth of $1/8$ inch leaving a cutting portion for the blade that is only $1/16$ of an inch thick. Thus, the entering end of the measuring cup 153 can be disposed within about $3/32$ to $1/8$ of an inch from the end of the extrusion nozzle as indicated in FIGS. 11 and 12.

As shown in FIGS. 6 and 7, the guide rods 165–165' for the blade carrier bar 164, extend upwardly through the overhanging platform 146 and thence through respective guide members 170–170' which extend upwardly from a mounting base 171. The cut-off means operating-cylinder I is mounted on the base 171 between the guide members 170–170' and extends vertically upward from the base, as shown in FIG. 6. A piston rod 172 extends downwardly from the cylinder I, through a suitable opening in the base and platform 146 and rigidly connects with the blade carrier bar 164, as shown in FIG. 10. The cylinder I and its piston rod 172 are thus the operation means for reciprocating the patty cut-off knives 162–162', through the agency of the knife carrier bar 164, and the operating and guide rods 165–165' serve the purpose of keeping the carrier bar square with the axes of the nozzles 120–121.

As shown in FIGS. 3, 4 and 7 the patty cut-off knife reciprocating means is also arranged to actuate a pair of control valves C and D, which are mounted on a vertically disposed support member 173 extending vertically upward from the overhanging machine extension 146 adjacent the cut-off knife operating cylinder I. As indicated in FIGS. 4 and 7 each of the guide rods 165 and 165' is provided with a valve actuating arm, 174 and 175, respectively, each of which is adapted to operate the respective valve only when moving in one direction. Thus the operating arm 174 is arranged to pass the valve D (see FIG. 7) when moving in the downward direction and to operate the valve D only as the guide rod 165 approaches its uppermost position. Similarly the valve actuating arm 175 is arranged to operate the valve C only when the guide rod 165' reaches the lowermost position in the stroke of the piston rod 172 and to pass the valve C on upward movement of the guide rod. The function of the valves C and D will be explained later in connection with the operation of the machine.

The extrusion nozzle

As shown in FIG. 7 the extrusion nozzle 120 has a longitudinal passage which tapers inwardly from a relatively wide entrance opening to a final cylindrical passage having the diameter desired for the extruded patty. As shown in FIG. 7 the length of the cylindrical terminal portion of the extrusion nozzle passage is about five or six times the thickness of the completed patty, and the tapered portion of the nozzle passage is of almost the same length. This arrangement of the extrusion nozzle is particularly suitable when the material being extruded is diced meat, and the object of having a tapered portion and then a straight cylindrical portion for the nozzle passage is to cause a radial compression of the material and then to hold it in its compressed condition for a sufficient time that the material will take a "set," so that the finished patty will not disintegrate or fall apart when it is dropped into the pie plate. It is to accomplish this result that the measuring cup 153 is also provided to receive the extruded material and hold it in its radially compressed condition during the time that the cut-off knife 162 is acting to sever the patty from the main stream of the material in the extrusion nozzle 120, the measuring cup 153 confining the patty material so that the impact of the cut-off knife will not cause the patty to break apart.

The control system and its operation of the machine

The actuating and control system for one complete unit of the hereindisclosed meat patty forming and depositing mechanism is illustrated by FIG. 14 of the drawings and as therein shown it will be seen that the said control system is designed for automatic alternate operation of the two extrusion sections of the said unit. As shown this system comprises the following elements;

(1) 4-way, spring loaded, valve means A and B which normally direct the pressure fluid to elevate the patty severing knife means 162 and to restore the patty size measuring devices 153 and 154 to their operative positions; and which, when actuated by the respective cams 110–111 driven by the plate conveyor M, in timed relation with the positioning of a pie plate beneath the respective extrusion nozzle, direct the fluid pressure to actuate the knife means 162 to cut off a preformed patty and then, when the knife has severed the patty, to retract the patty sizing means 153–154 and operate the blow-off nozzle 163 for causing the severed patty to be dropped into the respective pie plate.

(2) Normally closed valve C, operated by the actuator 175 on the knife guide rod 165' at the end of its patty severing stroke, to direct pressure from the valves A–B to the cylinder II, for causing the retracting operation of the patty sizing means 154 and the operation of the patty blow-off nozzles 163.

(3) Spring closed 3-way control valves A–1 and B–1, actuated by the pressure pad or patty sizing means 154 for cutting-off driving pressure to the cylinders 128–129 and stopping the respective extrusion plungers 127 when a proper sized patty has been formed.

(4) Spring closed, 3-way control valve D which operated by actuator 174 upon elevation of the knife guide rod 165, initiates an operating cycle for one or the other of the extrusion plungers 127 to form a patty at the discharge end of a respective one of the extrusion nozzles 120 and 121.

(5) 3-way, fluid pressure actuated valves A–2 and B–2, which are actuated by operation of the control valves A–1 and B–1, respectively, to stop operation of the respective extrusion plunger cylinders 128 and 129.

(6) Spring closed, 3-way control valves A–3 and B–3 which actuated by the valve operating arm 145 on the respective extrusion plunger piston rods 132 and 133, each at the end of its forward stroke, for initiating automatic shift of the patty forming and depositing operation, from one section of the unit mechanism to the other, or alternately between the rotary-cam operated valve means A and B.

(7) 4-way, fluid pressure actuated valve E, controlled by valves A–3 and B–3, for operating the sleeve cylinders 135 and 134, respectively, to drive the respective extrusion sleeves 126 and 125, alternately, in the forward direction.

(8) 3-way, fluid pressure actuated valves A–4 and B–4, controlled by the system reversing valve F and the valves A–3 and B–3, for causing the respective extrusion sleeves 125 and 126 to retract or shift in the reverse direction.

(9) Spring closed, 3-way, momentarily operated control valves A–5 and B–5 actuated by the valve operating arm 144 on the piston rods 136 and 137 for the respective extrusion sleeves 125 and 126, each as it reaches its forward seated position on the respective extrusion nozzle, for effecting automatic shift of the patty forming and depositing operation from the control of valve means B to the control of valve means A, and from valve means A to valve means B, respectively.

(10) 3-way, fluid pressure actuated circuit control valve F, operated between alternate positions by the extrusion sleeve actuated control valves A–5 and B–5 for shifting the extrusion plunger operating circuit from control of valve B–1 to control of valve A–1 and vice versa; and

(11) 4-way flow control valve G, selectively controlled by valve F, for shifting the fluid pressure supply for the patty-cutter-cylinder I between the system of valve means A and the system of valve means B.

Assume now that the material supply hopper 122 is filled; that the patty forming and depositing mechanism has been actuated through several cycles of extrusion sleeve and plunger operation; that the nozzles 120 and 121 are charged and ready to produce meat patties; that the extrusion sleeve 125 is fully charged and engaged with the rearward end of the nozzle 120 of the "A" section of the machine, the extruding plunger 127 being retracted in the sleeve 125; that a patty of predetermined size has been extruded from the nozzle 120 ready for deposit into a pie plate carried by the conveyor M and approaching the deposit position below the nozzle 120; and that the fluid pressure supply valve G has been shifted to supply the valve means A from the outlet 15. As so conditioned, the automatic operation of the system is carried on by the "A" section cam 110 causing operation of the valve means A, against the force of its loading spring, to connect the inlet 5 with the outlet 6 when the pie plate $P_1$ becomes aligned with the nozzle 120.

As before mentioned the cams 110 and 111 are angularly adjusted on the drive shaft 108 so as to operate the respective valve means A and B when a pie plate is so positioned relative to the respective nozzle that a measured and severed meat patty will fall into substantially the center of the pie plate, as indicated in FIG. 2. Also the drive shaft 108 is positively driven by the conveyor M so as to make a full 360° revolution for each lineal increment of conveyor travel equal to the center-to-center distance between successive uniformly spaced plate holders O. Thus, since each of the cams 110 and 111 has a single lobe, each of the valve means A and B will be operated once for each revolution of the drive shaft 108. As shown in FIG. 14, however, when one of the valve means A and B is pressurized the other is exhausted to atmosphere through the 4-way supply valve G, and only the one is effective.

It will now be seen from FIG. 14 that pressure fluid leaving the valve A at 6 will be directed by conduit 6.1 to one arm of a T-shaped shuttle valve H and thence through the center leg thereof to the upper or driving end of the knife-means cylinder I by way of conduit 6.2. A branch conduit 6.3, from the center leg of the shuttle valve H, leads through the valve C to the front end of the cylinder II to cause retraction of the patty-size measuring means slide bracket 147 upon operation of the valve C by the actuator 175 on the descending knife guide rod 165'. The successive operation of the cylinders I and II results in a properly sized meat patty being severed at the front end of the nozzle 120 and dropped into the center of a pie plate, as before explained.

Then upon passing of the valve operating lobe of cam 110 to release the valve means A, the latter is returned to its normal position by its loading spring and the fluid pressure at 5 is delivered through the outlet 7 and conduit 7.1 to one arm of a second T-shaped shuttle valve K and from the center leg thereof to the bottom end of cylinder I, through conduit 7.2; and to the rear end of cylinder II through branch conduit 7.3. This results in the knife 162 being elevated by the cylinder I; and the patty measuring means 153–154 being restored to the normal receiving position by the cylinder II, the pressure fluid in the opposite ends of the said cylinders being exhausted through the conduits 6.3, 6.2, and 6.1 and the exhaust port 8 of the valve means A.

Upon upward movement of the knife guide rod 165, by operation of the cylinder I, the 3-way valve D is momentarily opened by the operating arm 174 and a charge of pressure fluid from a supply line 8.1 is delivered by a conduit 8.2 to the inlet 8.3 of the system-reversing and extrusion-control valve F. From the control valve F fluid pressure from the valve D is directed by conduit 9 to the pilot 9.1 of the extrusion plunger operating valve A–2 which is thus caused to open communication between a branch fluid pressure supply line 10 and a conduit 11, leading directly to the rear end of the plunger cylinder 128, for causing the plunger 127 to begin extrusion of a second patty from the nozzle 120.

As shown in FIG. 14 the supply of pressure fluid for operation of the cylinders I and II, for the patty severing and measuring means, as well as for the plunger cylinder 128, is primarily controlled by the valve G which is directly connected by a conduit 13 with a tank or reservoir of pressured fluid, not shown. This valve G has a single inlet 14 and two delivery outlets 15 and 16 and is adapted for operation by pilot means 17 and 18 for selectively connecting the inlet 14 with a respective delivery outlet. Also the valve G is arranged to bleed each delivery outlet to atmosphere when it is not in communication with the inlet 14.

It will now be understood that for operation of the system by the valve means A the supply valve G is conditioned to deliver pressure fluid to the valve A, from the delivery outlet 15, by way of a conduit 19. The conduit 10, supplying the valve A–2, also connects with the delivery outlet 15 and the valve G is conditioned for such delivery by operation of its pilot 17 which is actuated by pressure fluid from the valve F supplied by a branch 9.2 leading from the conduit 9.

Operation of the control valve A–2 for the plunger 127, by its pilot 9.1, connects the supply conduit 11 for the extrusion plunger cylinder 128 with the outlet 15 of the primary fluid pressure supply valve G and initiates movement of the plunger 127 in the sleeve 125 to extrude material for a meat patty from the A section nozzle 120. As the material is extruded from the nozzle it engages the measuring or sizing pressure pad 154 and forces it rearwardly in the sizing cup or sleeve 153 until the amount for the desired size patty has been produced. At that point the pressure pad stem 155 opens the normally closed valve A–1 and permits pressure fluid, from a supply line 20, to pass through a conduit 21 to the pilot 22 of the plunger control valve A–2 whereupon the valve A–2 is operated to close off the primary pressure fluid supply to the conduit 11 and plunger cylinder 128, thereby stopping plunger movement.

The A-section of the mechanism is now conditioned for a repetition of the before described patty severing and depositing operation when a proper pie plate on the next plate holder O becomes aligned with the nozzle 120 and the A-section cam 110 again operates the valve means A. This forming and depositing operation is repeated for each passage of a plate holder O past the said nozzle until the plunger 127 approaches the end of its normal stroke in the sleeve 125 where the plunger valve operating arm 145 actuates the valve A–3 to initiate shift of the patty extruding and depositing operation from the A-section to the B-section of the mechanism.

The operation of the 3-way valve A–3 sends pressure fluid, from a supply line 23, to the pilots 24 and 25 of the valves A–4 and E by way of conduits 26 and 27, respectively, and causes shifting of these valves from the A-section position to the B-section position. This operation of 4-way valve E, which is supplied with pressure fluid by the supply line 28, directs the flow of pressure fluid from the outlet 29, through the conduit 30, to the rear end 31 of the B-section sleeve cylinder 135 to drive the sleeve 126 in the forward direction, through the supply hopper 122, to become filled with the meat to be extruded and into sealing engagement with the entrance end of the B-section nozzle 121. Simultaneously the operation of the 3-way valve A–4 by pressure fluid directed through conduit 26 to the pilot 24, closes off the supply line 32 which acts on the forward end of the cylinder 135 through the conduit 33 and bleeds the forward end of this cylinder to atmosphere, through the valve port 34, so that the sleeve cylinder is free to move forwardly.

When the sleeve 126 reaches its seating position against the nozzle 121 it will momentarily open 3-way valve B–5 and direct fluid pressure from the supply line 23, through conduit 35, to the pilot 36 of the system reversing and control valve F. This actuates the valve F to direct pressure fluid from the conduit 8.2, supplied by the valve D when the knife guide rod 165 is at its upper position, to a conduit 37 which has a branch 38 leading to the pilot 39 of the plunger control valve B–2 which connects the plunger cylinder 129 with the primary pressure source at the valve G.

As shown in FIG. 14, the conduit 37 extends to the pilot 18 of the valve G and shifting of the system reversing valve F directs pressure fluid from the conduit 8.2 to operate the valve G so as to connect the inlet 14 with the delivery outlet 16 while venting to atmosphere the lines connected to the outlet 15. Thus, fluid pressure is supplied from the outlet 16 to conduit 40, leading to the inlet 41 of 3-way valve B–2, and simultaneously to the conduit 42 leading to the inlet of the knife control valve B. The valve B–2 connects the inlet 41 with a conduit 43 which leads to the plunger cylinder 129 for actuating it to extrude a patty from the nozzle 121.

Operation of the plunger driven by the cylinder 129 in the sleeve 126 can not happen, however, until fluid pressure is supplied to the valve F by the valve D, which is only momentarily actuated as the knife guide rod 165 reaches the top of its return stroke after the knife 162 has severed a patty from the nozzle 120. Thus, when the valve actuator 145, on connecting rod 132 for the plunger 127, operates the valve A–3 to initiate a reversal of the system, or shift from A-section operation to B-section operation, the plunger 127 continues to complete the extrusion of a full size patty. The reversal or shift procedure for valves E and F takes place, however, while this last patty is severed and deposited in a pie plate and by the time the knife has returned to its upper position the sleeve 126 has completed its inward stroke to operate the valve B–5, and the valve F has become shifted so that operation of the valve D by the knife guide rod 165 will cause the pressure fluid to actuate the valves B–2 and G and start operation of the extruding plunger cylinder 129. This will happen in less time than that required to bring the next pie plate into operative position and a fully formed patty will be ready for deposit when the B-valve cam 111 comes into operating position.

Operation of the valve D by the actuator 174 on the knife guide rod 165 after the severing of the last patty from the A-section nozzle 120, also results in actuation of the 3-way valve B–4, by its pilot 44, through the branch conduit 45 leading from the line 37, whereby the fluid pressure supply line 46 is connected with conduit 47 leading to the front end of the A-section sleeve cylinder 134. This causes retraction of the sleeve 125 and, as before described, the rearward movement of the A-section sleeve causes engagement of the yoke 140 thereof with the respective extruding plunger shaft 132 to move it also and restore the plunger 127 to its starting position ready for the next cycle of patty forming and depositing operations of the A-section mechanism. During this operation the rear ends of the sleeve and plunger cylinders 134 and 128 are vented through the conduits 48 and 11 leading to the exhaust ports 49 and 50 of the valves E and A–2, respectively.

The function of the valve C in the conduit 6.3, leading to the forward end of the cylinder II, is to delay operation of the cylinder II until the cut-off knife means has reached the end of its downward, patty severing stroke. This results in the patty being confined by the measuring cup or sleeve 153 during the severing operation and obviates likelihood of the patty breaking apart while being cut from the nozzle 120. Thus the valve C is disposed on the support column 173 for operation by the arm 175 when the knife means has reached the bottom of its stroke and has severed the patty. Then opening the conduit 6.3 causes retraction of the measuring means cup or sleeve 153 by the cylinder II leaving the patty free to drop away from the pressure pad 154 and into the pie plate below. The blow-off nozzle 163 is operated with the retraction of the cup to obviate sticking of the patty on the face of the pressure pad 154.

The B-section of the patty forming and depositing mechanism will now operate to form successive patties in the same manner as did the A-section, the cam 111 intermittently operating the valve B to actuate the knife cylinder I for cutting off a patty from the nozzle 121 and then to return the knife to its upper position where the valve D is actuated to send fluid pressure through the valve F and lines 37 and 38 to activate the plunger cylinder 129 by connecting supply conduits 40 and 43. The plunger driven by the cylinder 129 and operating in the sleeve 126 will then extrude a patty from the nozzle 121 until a predetermined size is reached at which point the respective measuring means pressure pad 154 will open valve B–1 and send pressure fluid through conduit 51 to the pilot 52 of valve B–2 to close the same and stop movement of the piston in cylinder 129 and the plunger operated thereby.

The apparatus is now condition for the next operation of the knife means upon actuation of the valve B by the respective cam 111 and this patty depositing and forming cycle will repeat for each revolution of the cam until the plunger operating in the sleeve 126 progresses a sufficient extent to actuate the reversing switch means B–3. Operation of the switch B–3 will direct pressure fluid from the supply line 23, through the conduit 53, to the pilot 54 of the valve E causing the said valve to shift and apply pressure from the supply line 28 to the rear end of the sleeve cylinder 134 by way of conduit 48.

This drives the sleeve 125 forwardly, through the hopper 122, to become charged with meat for subsequent extrusion from the A-section nozzle 120 and at the same time the pressure on the rear end of the sleeve cylinder 135 is relieved to atmosphere through conduit 30 and exhaust port 55 in valve E.

Simultaneously with the operation of the valve E, the fluid pressure from line 23, issuing from the switch valve B–3, is directed through conduit 56 to the pilot 57 of valve B–4 which opens to bleed the conduit 47, connecting the forward end of the sleeve cylinder 134, to atmosphere through exhaust port 58.

Seating of the A-section sleeve 125 against the respective nozzle 120 causes momentary operation of the switching valve A–5 which supplies fluid pressure from the line 23 to the conduit 59 which leads to the pilot 60 of the system reversing valve F and causes that valve to shift so as to connect the line 8.2, from the valve D, with the conduit 9 which in turn leads to the plunger control valve A–2 and the B-section-sleeve-retract valve A–4. This sets up the system so that upon the next operation of the patty-severing knife means, the return of the knife means to its upper position and operation of the velve D will actuate the valve A–2 to energize the A-section plunger cylinder 128 to drive the respective plunger 127 forwardly to form a patty at the discharge end of the nozzle 120. Simultaneously the primary pressure supply valve G will be operated by its pilot 17 to shift the pressure from knife control valve B to the valve A, for operation of the A-section of the apparatus, and the valve A–4 will be operated by its pilot 61 to connect the pressure supply line 32 with the conduit 33 and cause retraction of the B-section sleeve and plunger elements.

The A-section of the apparatus will now operate to form and deposit meat patties automatically as each plate holder O aligns a respective pie plate with the A-section nozzle, until the A-section plunger 127 has completed its forward stroke when again the system will automatically shift to operation of the B-section, all within the time period for the next successive plate holder to align the respective pie plate with the B-section nozzle 121.

It will be understood that the B-valve cam 111 is timed, relative to the A-valve cam 110, so as to cause the severing of a patty from the nozzle 121 when the pie plate $P_1$ is in proper position with respect to the nozzle 121. Since the nozzles are spaced apart in the direction of conveyor and pie plate travel the operation of the B-valve will be somewhat in advance of the operation of the A-valve. All operations of the machine, however, are controlled by the rotary cams on the shaft 108 which are timed precisely to pie plate position in the course of conveyor travel; and the speed at which the internal operations of the machine are accomplished allows for a relatively high speed of continuously moving conveyor operation without danger of a pie plate failing to receive a patty deposit.

The main advantages of this invention reside in the provision of a continuously operating meat patty forming and measuring machine which automatically deposits a meat filler of predetermined size into a pie plate carried by each of a continuous series of plate holders moving uninterruptedly along a predetermined path; in the improved meat patty forming and depositing mechanism whereby a pair of alternately operated extrusion nozzles are caused to provide automatically a continuous and uninterrupted supply of meat patties for filling a continuously moving series of uniformly spaced pie plates; in the improved means for measuring and depositing successive portions of automatically extruded material; in the improved arrangement of automatic extrusion and cut-off mechanism whereby a plurality of receptacles, traveling as a group, can be charged substantially at the same time and while moving along a predetermined path; and in the improved sectional form of apparatus for filling meat pies whereby each one of a group of pie plates, carried by a single continuously moving plate holder, can be supplied individually with an automatically formed meat patty of predetermined size.

Although but one specific embodiment of this invention has been herein shown and described it will be understood that numerous details of the construction shown may be altered or omitted without departing from the spirit of this invention as defined by the following claims.

I claim:
1. A patty forming and depositing means comprising
 (a) a receptacle for patty forming material,
 (b) an extrusion nozzle extending outwardly from said receptacle and having an axially extending passage opening into said receptacle and terminating at its opposite end in a discharge orifice,
 (c) a tubular sleeve extending into said receptacle through the wall thereof opposite said nozzle and in axial alignment with the passage opening thereof, said sleeve being axially shiftable transversely of said receptacle and having an open end adapted to register with said nozzle opening,
 (d) means for operating said sleeve to move the said open end thereof across the receptacle toward and away from the said one wall and into and out of registering engagement with the nozzle opening, and
 (e) pressure means for driving patty forming material from said sleeve and into the passage of said nozzle during registering engagement of the open end of the sleeve with the said nozzle opening,
 (f) the opening of the nozzle passage into said receptacle being of greater cross-sectional area than the said discharge orifice and the cross-sectional area of the open end of said sleeve being substantially the same as that of the said opening of the nozzle passage.

2. A patty forming and depositing means according to claim 1 wherein the axial passage of the nozzle is annular cross section and the opening thereof into the receptacle is of greater diameter than the said discharge orifice, and wherein the open end of the sleeve is annular and of substantially the diameter of the opening of the nozzle into the receptacle.

3. A patty forming and depositing means according to claim 1 wherein the nozzle passage tapers inwardly from the opening into the receptacle to a point intermediate the ends of the nozzle passage and the nozzle passage then continues to the discharge orifice with a substantially uniform cross sectional area.

4. A patty forming and depositing means comprising an extrusion nozzle extending outwardly from a receptacle for patty-forming material and having an axially extending passage opening into the receptacle and terminating at its opposite end in a discharge orifice, pressure means for driving said patty-forming material into the passage of said nozzle and extruding said material from said discharge orifice, a pressure pad disposed adjacent the discharge orifice of said nozzle for engagement by material extruded therefrom, an open ended cup member surrounding said pressure pad and axially aligned with said discharge orifice for receiving material extruded from the nozzle, said cup member having substantially the same internal dimensions as said orifice and said pressure pad being axially shiftable in said cup member and independently thereof, and means positioned for operative engagement by said pressure pad upon predetermined movement thereof away from said nozzle for stopping operation of said pressure means.

5. A patty forming and depositing means according to claim 4 including patty cut-off means operable to move across the orifice of said nozzle and sever material extruded into said cup member, means for shifting said cup member away from said nozzle upon operation of said cut-off means, and means for shifting said pressure pad to the open end of said cup member as the cup member moves away from the nozzle.

6. A patty forming and depositing means according to claim 5 including means for operating said cut-off means at predetermined intervals, and means for starting operation of the pressure means upon completion of the operation of the cut-off means.

7. A patty forming and depositing means according to claim 5 including automatic means for operating said cut-off means at predetermined intervals, and means for starting operation of the pressure means upon completion of the operation of the cut-off means, and wherein the means for shifting the said cup member is actuated after material extruded into the cup member has been severed by the cut-off means.

8. A patty forming machine comprising
 (a) a receptacle for patty forming material,
 (b) first and second laterally spaced parallel extrusion nozzles extending outwardly from one wall of said receptacle and each having an axially extending discharge passage opening from said receptacle and terminating in a discharge orifice,
 (c) first and second tubular sleeves mounted on the wall of said receptacle opposite said one wall, each axially aligned with the passage opening of a respective one of said nozzles, each having an open end adapted to seat at said one wall in registry with the respective passage opening, and each being reciprocable axially to move its said open end transversely across said receptacle,
 (d) an axially shiftable plunger in each of said sleeves for forcing material therein toward the open end thereof,
 (e) means for reciprocating each of said sleeves individually to move its open end toward and away from the said one wall of the receptacle,
 (f) means for advancing each of said plungers, individually and intermittently toward the open end of the respective sleeve,
 (g) cutting means movable across the discharge orifice of each nozzle for severing patties from material extruded therefrom,
 (h) means for regulating the extent of advance of each of said plungers upon each operation thereof,
 (i) means actuated by the plunger of the first sleeve when approaching the end of its material forcing stroke for advancing the second sleeve across said receptacle to seat in axial registry with the passage of said second nozzle, and
 (j) means actuated by the second sleeve upon seating registry with the second nozzle opening for initiating intermittent operation of the respective plunger means to extrude material from the second nozzle.

9. A patty forming machine according to claim 8 wherein the passage through each nozzle is of annular cross section, the opening of each nozzle from the receptacle is of greater diameter than the discharge orifice, the passage through each nozzle tapers inwardly from the said opening to the diameter of the orifice at a point about midway between the ends of the said passage, and each of the said sleeves is of annular cross section with its said open end of a diameter substantially the same as that of the respective nozzle opening.

10. A patty forming machine according to claim 8 including continuously moving conveyor means for transporting upwardly open receptacles below the discharge orifices of said nozzles; means for advancing the cutting means for a single patty severing operation independently of the plunger advancing means and in timed relation with said conveyor means, and means for actuating the plunger advancing means upon completion of each patty severing operation and retraction of the cutting means.

11. A patty forming machine according to claim 10 wherein means for regulating the advance of the plungers comprises a pressure pad disposed adjacent the discharge orifice of each nozzle for engagement by material extruded therefrom, each pressure pad being shiftable away from the nozzle in the axial direction thereof upon engagement of extruded material therewith, an open ended cup member surrounds each pressure pad and is axially aligned with the respective nozzle orifice for receiving material extruded therefrom, each cup member has substantially the same internal dimensions as the respective orifice and each pressure pad is axially shiftable in the respective cup member independently thereof, means are provided for retracting said cup members away from the nozzles upon operation of said cutting means, and means is provided for shifting the pressure pads to the open end of the cup members as the cup members move away from the nozzle.

12. A patty forming machine according to claim 11 wherein the cutting means is a reciprocable member moving to and fro across both nozzle orifices simultaneously during each patty severing operation, the means for retracting the cup member is actuated by the cutting means as it advances across the nozzle orifices in completion of a patty severing operation, and the plunger advancing means is activated by control means operated by said cutting means as it returns from a patty severing stroke.

13. A patty forming mechanism comprising an extrusion nozzle having a discharge orifice, pressure means operable for forcing patty forming material into and through said nozzle, means for intermittently actuating said pressure means to extrude said material from said nozzle, a pressure pad mounted adjacent the nozzle orifice in axial alignment therewith for engagement by material extruded from the nozzle, said pressure pad being shiftable axially away from the nozzle by the said material as it extrudes from the nozzle, means positioned for operation by the pressure pad upon a predetermined axial movement thereof for stopping the operation of said pressure means, cutting means movable across the said nozzle orifice for severing material extruded therefrom, an open-ended cup member surrounding said pressure pad and aligned with said nozzle orifice for receiving the extruded material as it issues from the orifice, said pressure pad being axially shiftable independently of said member, means for intermittently driving said cutting means across the nozzle orifice to sever extruded material, means for retracting said member as said cutting means completes its cutting stroke, and means for moving said pressure pad to the open end of said cup member as said cup member is being retracted.

14. A patty-forming and depositing means comprising
    (a) first and second extrusion nozzles extending outwardly from a receptacle and each having an axially extending passage opening into the receptacle and terminating at its opposite end in a discharge orifice,
    (b) first and second tubular sleeves each axially aligned with a respective nozzle and having an open end movable across said receptacle toward and away from said opening of the nozzle, each sleeve seating on the respective nozzle when in forward position,
    (c) first and second plungers each reciprocable in a respective sleeve,
    (d) means for reciprocating each of said sleeves individually to move the open end thereof transversely of the receptacle toward and away from the respective nozzle,
    (e) means for advancing each of said plungers individually toward the respective nozzle and in increments of forward movement,
    (f) means actuated by the first plunger when it approaches the end of its forward stroke for activating movement of the second sleeve to seat its open end on the second nozzle,
    (g) and means actuated by the second sleeve as it seats on the respective nozzle for activating the second plunger to advance in the second sleeve.

15. The patty-forming and depositing means as defined by claim 14 wherein the last named means also operates the means for reciprocating the first sleeve to retract the same from its nozzle.

16. The patty-forming and depositing means as defined in claim 15 wherein means are provided for actuation by the second plunger when it approaches the end of its forward stroke for actuating movement of the first sleeve to seat its open end on the second nozzle, and wherein seating of the first sleeve operates means for activating advancing movement of the first plunger.

References Cited
UNITED STATES PATENTS

| | | | |
|---|---|---|---|
| 2,383,536 | 8/1945 | Elliott | 107—15 |
| 3,101,761 | 8/1963 | Buehler et al. | 17—32 X |
| 3,218,994 | 11/1965 | Valentyne. | |

WILLIAM W. DYER, Jr., *Primary Examiner.*

WALTER A. SCHEEL, W. GRAYDON ABERCROMBIE, *Examiners.*

J. SHEA, *Assistant Examiners.*